US008266581B2

(12) United States Patent
Brandt et al.

(10) Patent No.: US 8,266,581 B2
(45) Date of Patent: Sep. 11, 2012

(54) SOFTWARE DEVELOPMENT APPARATUS WITH REGULATED USER ACCESS

(75) Inventors: Wayne D. Brandt, Morton, IL (US); Vernon R. Smith, Peoria, IL (US); Walt E. Earleson, Morton, IL (US); Michael E. Roth, Edwards, IL (US); Dale B. Herget, Mapleton, IL (US); Steven C. Bray, Dunlap, IL (US); Wayne J. Wulfert, East Peoria, IL (US); Jeffrey S. Morris, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 823 days.

(21) Appl. No.: 11/185,707

(22) Filed: Jul. 21, 2005

(65) Prior Publication Data

US 2007/0022408 A1    Jan. 25, 2007

(51) Int. Cl.
*G06F 9/44* (2006.01)
(52) U.S. Cl. .................. 717/106; 717/110; 717/136
(58) Field of Classification Search .................. 717/101, 717/104, 105, 106, 110, 136; 716/4; 703/1, 703/5, 14, 16, 21, 22
See application file for complete search history.

(56) References Cited

U.S. PATENT DOCUMENTS

| | | | |
|---|---|---|---|
| 5,778,368 A * | 7/1998 | Hogan et al. ................. 707/10 |
| 6,618,852 B1 | 9/2003 | van Eikeren et al. | |
| 6,681,391 B1 | 1/2004 | Marino et al. | |
| 6,742,165 B2 | 5/2004 | Lev et al. | |
| 7,562,347 B2 * | 7/2009 | Baumgart et al. ............ 717/120 |
| 2003/0046282 A1 * | 3/2003 | Carlson et al. ................... 707/6 |
| 2004/0225995 A1 * | 11/2004 | Marvin et al. ................ 717/100 |
| 2006/0089828 A1 * | 4/2006 | Larsen et al. ................... 703/22 |
| 2006/0101442 A1 * | 5/2006 | Baumgart et al. ............ 717/162 |
| 2006/0190364 A1 | 8/2006 | Bizovi et al. | |
| 2007/0033567 A1 * | 2/2007 | Carlson et al. ................ 717/100 |

FOREIGN PATENT DOCUMENTS

JP     2001-175503    *    6/2001

OTHER PUBLICATIONS

Experiences from software reuse in industrial process control applications, Matsumoto, Y., 1993, IEEE, pp. 186-195.*
Reusing software: issues and research directions, Mili, H.; Mili, F.; Mili, A., 1995, IEEE, pp. 528-562.*
Providing reusability in distributed object control systems, McClatchey, R.; Le Goff, J.-M., 1995, IEEE, pp. 765-771.*
Reuse sensitive process models: are process elements software assets too?, Arbaoui, S.; Oquendo, F., 1996, IEEE, pp. 21-24.*

(Continued)

*Primary Examiner* — Wei Zhen
*Assistant Examiner* — Satish Rampuria
(74) *Attorney, Agent, or Firm* — Miller, Matthias & Hull

(57) ABSTRACT

A software system development apparatus is provided. The software system development apparatus may include a processor and a computer-readable medium operatively coupled to the processor. The apparatus may also include a system design tool program stored on the computer-readable medium that, when executed by the processor, is operable to regulate user access to at least one aspect of the system design tool according to one or more authorization categories of users of the system design tool. The system design tool may also be operable to generate a real-time embedded control software system by selecting from a collection of reusable software components stored and described in a catalog in accordance with the Reusable Asset Specification (RAS).

20 Claims, 1 Drawing Sheet

OTHER PUBLICATIONS

Ivica Crnkovic; Component-based approach for embedded systems; accessed from http://citeseerx.ist.psu.edu/viewdoc/download-?doi=10.1.1.1.3135&rep=rep1&type=pdf.; 2004, pp. 1-6.*

López et al., Real-Time Modelling of Distributed Component-based Applications; accessed from http://citeseerx.ist.psu.edu/viewdoc/download?doi=10.1.1.109.6299&rep=rep1&type=pdf.; pp. 2-8.*

Bachmann et al., A Meta-model for Representing Variability in Product Family Development; Springer-Verlag Berlin Heidelberg 2004; pp. 66-80.*

System Development Risk Reduction Using a System Performance Model, Bertke, IEEE, vol. 2 May 22-26, 1995, pp. 729-736.

Guidelines for Automated Implementation of Executable Object Oriented Models for Real-Time Embedded Control Systems, Saksena et al., IEEE, Dec. 2-5, 1997, pp. 240-251.

The RTES Project—BTeV, and Beyond, Haney et al., IEEE, Jun. 4-10, 2005, pp. 143-146.

RFC Submitted to OMG Reusable Asset Specification (RAS), Document #: ad/Oct. 12, 2003.

* cited by examiner

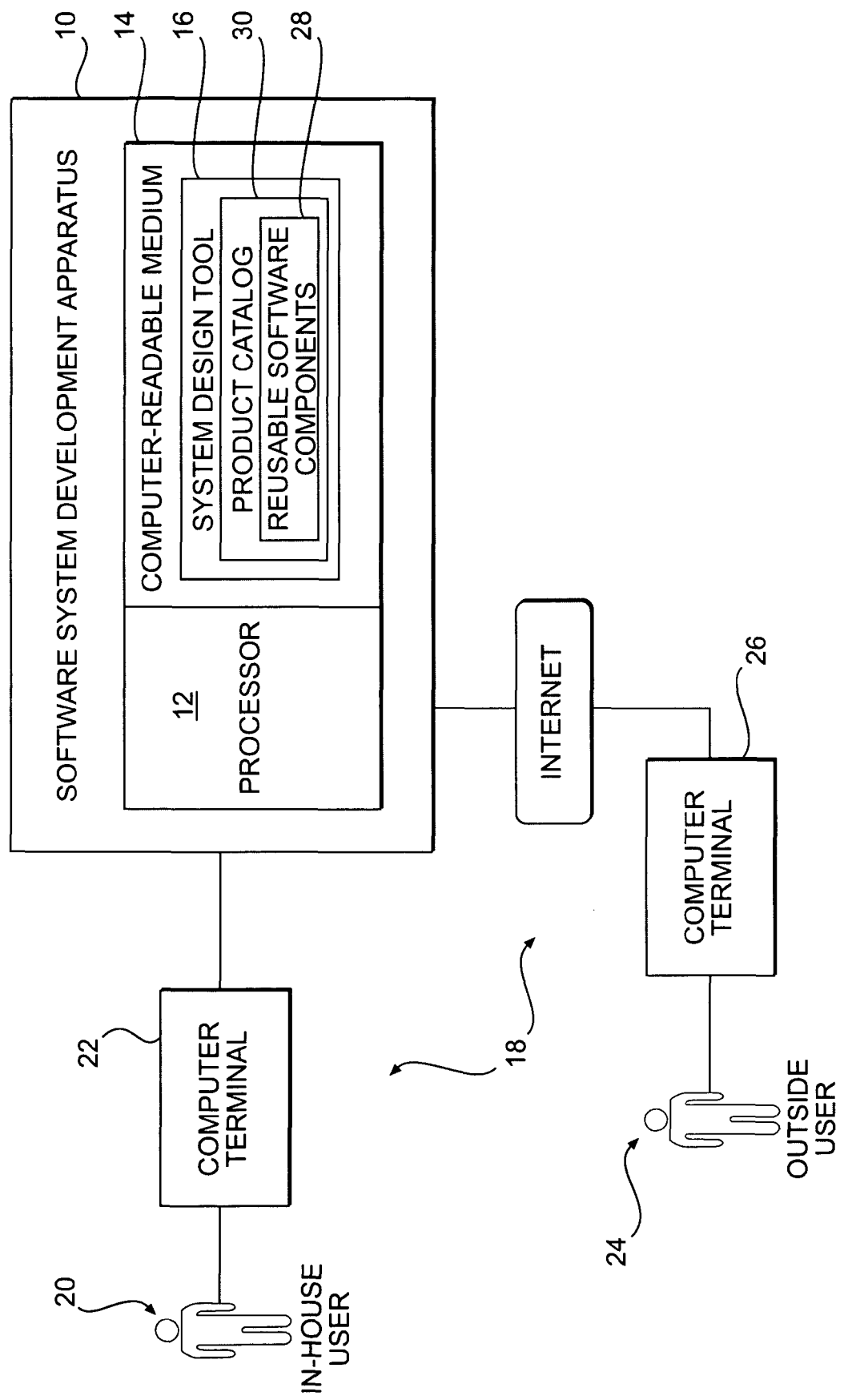

SOFTWARE DEVELOPMENT APPARATUS WITH REGULATED USER ACCESS

TECHNICAL FIELD

The present disclosure is directed to a software system development apparatus with regulated user access and, more particularly, to a software system apparatus including a software system design tool operable to regulate user access to one or more aspects of the system design tool.

BACKGROUND

Many devices include embedded control systems. Embedded control system may be associated with work machines, such as construction equipment. Construction equipment may include electrical components that are communicably coupled to each other through one or more communication conduits. Examples of such electrical components may include electronic control units (ECUs), network managers, control panels, etc.

A software system can be designed using a computer-generated design environment. A design environment may include a system design tool. A system design tool may include a software program that allows a designer to design a system using a function-based approach. In addition, a system design tool may include a database, often referred to as a "catalog," identifying software components that are available to the design tool for building the software system. Each identified software component may be operable to perform a particular function and may be designed for use in conjunction with a particular piece of electronic hardware.

A system design tool may present a graphic user interface (GUI) to the designer. Through the GUI, the design tool may accept input, which may indicate one or more functions or sub-functions that the system would have to perform in order to perform the overall function of the system. The GUI may also accept input indicating the interaction between the sub-functions. For example, the design tool may be used to select, from the catalog, software components that perform the desired sub-functions. The design tool may also be used to conceptually build the software system by facilitating assembly of the identified software components according to the desired interaction of the sub-functions.

Historically, the way in which software components have been described in catalogs has depended on the particular way in which the design tools were configured to operate. Thus, the categories of information that needed to be included in a particular catalog of a particular design tool were somewhat unique. Further, for many software components available in the market, those categories of information were not readily available due to technical and/or confidentiality concerns. As such, a catalog may have included a relatively limited number of software components. In addition, because some information needed to be included in the catalog could be proprietary, design tools were generally configured as closed systems, available only to the in-house designers of a company and/or designers having a close relationship with the company.

Systems have been developed, which include user access regulating features. For example, U.S. Pat. No. 5,778,368, issued on Jul. 7, 1998 to Hogan et al. ("the '368 patent"), discloses a system configured to retrieve reusable real-time embedded software components from one or more repositories, wherein access to the repositories is regulated.

While the system of the '368 patent may regulate access to various repositories, the system of the '368 patent does not specify that the components in the repositories are stored and described in accordance with a standardized system of packaging reusable software assets, such as the Reusable Asset Specification (RAS). This lack of standardized packaging may limit the amount of sharing of components that the system of the '368 patent may be capable of achieving. For example, without standardized packing of components, the system may not be able to use components of outside vendors due to lack of compatibility. Further, outside (not in-house) consumers may not be able to use components from the non-standardized repositories as such components may not be compatible with the systems of the outside consumers.

The disclosed system design tool is directed toward overcoming one or more of the shortcomings set forth above.

SUMMARY OF THE INVENTION

In one aspect, the present disclosure is directed to a software system development apparatus. The software system development apparatus may include a processor and a computer-readable medium operatively coupled to the processor. The apparatus may also include a system design tool program stored on the computer-readable medium that, when executed by the processor, is operable to regulate user access to at least one aspect of the system design tool according to one or more authorization categories of users of the system design tool. The system design tool may also be operable to generate a real-time embedded control software system by selecting from a collection of reusable software components stored and described in a catalog in accordance with the Reusable Asset Specification (RAS).

In another aspect, the present disclosure is directed to a method of developing a software system. The method may include accessing a system design tool program under one of two or more authorization categories of users of the system design tool. The authorization categories may regulate user access to a collection of reusable software components. Alternatively or additionally, the authorization categories may regulate user access to one or more features of the system design tool. The method may further include generating an embedded control software system utilizing one or more reusable software components stored and described in a catalog in accordance with the Reusable Asset Specification (RAS).

BRIEF DESCRIPTION OF THE DRAWINGS

FIG. 1 is a schematic block diagram of a software system development apparatus according to an exemplary disclosed embodiment.

DETAILED DESCRIPTION

FIG. 1 illustrates a software system development apparatus 10, which may include a processor 12, and a computer-readable medium 14 operatively coupled to processor 12. A system design tool 16 may be stored on computer-readable medium 14.

Computer-readable medium 14 may include any hardware configured to store computer-readable software, such as any appropriate type of mass storage provided to store any type of information needed for software system development apparatus 10 to function. For example, computer-readable medium 14 may include one or more hard disk devices, optical disk devices, or other storage devices to provide storage space.

System design tool 16 may be operable to generate real-time embedded control software systems for real-time embedded control systems. For purposes of this disclosure, the term "embedded control system" shall be defined as an electronic system wherein an electronic controller controls one or more electronic components. An example of "real-time" embedded control may include controlling a hardware and/or software system in a manner that allows the controlled system to perform substantially in accordance with its intended design specification.

One example of a real-time embedded control system may include an anti-lock braking system (ABS) for a vehicle. In an anti-lock braking system, a controller may transmit control signals to electronically operated valves in the braking system to regulate the pressure in the brake system. This pressure may be regulated to modulate wheel deceleration, which may be monitored by wheel speed sensors. In the context of ABS, the transmission of control signals occurs fast enough to cause pressure in the braking system to drop before the wheel stops turning. Some anti-lock braking systems can open and close the valves 15 times per second or more. In order to effect such rapid actuation of the valves, the control signals must be transmitted even more quickly.

The speed of delivery of commands and/or generation of outputs may be dependent on several factors including, for example, the operating speed of the system being controlled. For example, an engine control module (ECM) may deliver commands and monitor engine operating parameters at a relatively faster rate (e.g., on the order of milliseconds) as operating parameters of an engine must be controlled fast enough to keep up with an engine operating at several hundred to several thousand RPM. Conversely, a simple data collection system, such as a dump cycle counter, may operate in real-time, but at slightly slower rates of data transmission (e.g., up to 1 second).

As illustrated in FIG. 1, software system development apparatus 10 may interface with computer terminals 18 operable by users accessing a system design tool 16 in various ways. FIG. 1 shows an in-house user 20 accessing system design tool 16 from within a host organization of system design tool 16. For example, in-house user 20 may include a user accessing system design tool from an in-house computer terminal 22, which may be integrated with a local network of a company that hosts system design tool 16 for use by its employees, maintains system design tool 16, and/or serves as administrator of system design tool 16.

FIG. 1 also shows an outside user 24 (i.e., not in-house) accessing system design tool 16 from an outside computer terminal 26. For example, outside user 24 may include a customer (e.g., a designer who uses system design tool 16 and/or software components stored therein) or outside vendor (e.g., an entity from whom the host organization may obtain software components and/or other information) accessing system design tool 16 via the Internet, as shown in FIG. 1, or via any other kind of communications data link or portal.

System design tool 16 may be operable to generate (e.g., in response to user input) real-time embedded control software systems by selecting from a collection of reusable software components 28 stored and described in a catalog 30. Reusable software components 28 may be stored and described in catalog 30 in accordance with the Reusable Asset Specification (RAS) developed under the guidance of The Object Management Group (OMG), a computer industry standards organization. RAS defines a standard way to package reusable software. A reusable software asset may be any cohesive collection of artifacts that solve a specific problem or set of problems in software development. A reusable software asset (e.g., software component) is created with the intent of reuse. A reusable software asset is distinguished from other artifacts or collections of artifacts used in software development by its packaging. A reusable software asset's packaging may be the set of files that implement the solution and a structured set of information that defines and describes the reusable software asset as a whole.

System design tool 16 may be operable to regulate user access to at least one aspect of system design tool 16 according to one or more authorization categories of users of system design tool 16. For example, access may be regulated to software stored in catalog 30 and/or features of system design tool 16. Alternatively or additionally, the authorization categories may be based, at least in part, on one or more different levels of performance of system design tool 16 that may be available to users of system design tool 16.

System design tool 16 may be further operable to store software systems, which are generated using system design tool 16, in catalog 30 in such a manner as to be available for future use by users of system design tool 16. In some embodiments, system design tool 16 may be operable to store the software systems, generated using system design tool 16, in catalog 30 only if the software system was designed with user access to system design tool 16 under a predetermined authorization category.

Software system development apparatus 10 may be hosted by any type of host organization. Exemplary host organizations may include any type of organization who develops software systems, such as educational institutions or business organizations, such as manufacturers, suppliers, developers, etc. System design tool 16 may be maintained by any host organization and may be operable to regulate user access to confidential software of the host organization that may be stored in catalog 30. Alternatively or additionally, system design tool 16 may be operable to regulate user access to one or more features of system design tool 16 that are confidential to the host organization.

Industrial Applicability

In some embodiments, system design tool 16 may be made available to a greater user base by configuring system design tool 16 to distinguish between different classes of users, to determine the access level assigned to each class, and to give access to some portion of the capabilities of system design tool 16 commensurate with the assigned access level. For example, in-house user 20 (e.g., an in-house software system designer) using system design tool 16 may be allowed to view all of the characteristics of each software component identified in the database, including proprietary and/or confidential information. In-house user 20 may also be allowed to store the system that he/she designed back into the catalog for future use by others in designing future systems.

For outside user 24, however, system design tool 16 may be configured to provide outside user 24 access to only non-confidential information. Further, system design tool 16 may prevent the designed system from being stored in the catalog. The extent of access may vary depending on the particular needs of the each user class and those of the particular organizations with which they are affiliated.

An example of outside users may include companies or other organizations who, for example, design systems for customers using products from a host organization or company, who "hosts" system design tool 16. For example, a host organization may manufacture particular parts, such as hydraulic valves and/or actuators. An outside user company may design hydraulic systems that include the hydraulic components made by the host organization. In order to develop the software operable to control the hydraulic systems, the outside user company may access system design tool 16 to retrieve software components already developed and stored in catalog 30. Further, the outside user company may utilize system design tool 16 to assemble the software components to develop a software system operable to control the hydraulic system that they have designed.

The outside user company may be granted access to system design tool 16 under a predetermined authorization category. Depending on the relationship between the host organization and the outside user company, the outside user company may be authorized to access particular contents of catalog 30. For example, the outside user company may or may not be granted access rights to proprietary or otherwise confidential software components or other information stored in catalog 30.

Additionally or alternatively, the outside user company may, based on their authorization category, have access to different levels of performance of system design tool 16. For example, depending on the authorization category, certain aspects of system design tool that the outside user company has access to may be more or less powerful, such as varying levels of detail/information displayed by the graphic user interface (GUI), and/or detail and function of navigation tools for viewing the contents of and retrieving items from catalog 30.

Further, the outside user company may have access to different features of system design tool 16 based on their authorization category. For example, certain features, such as simulation capabilities, as well as other means of analyzing software systems under development may be available to users accessing system design tool 16 under predetermined authorization categories.

While embodiments of system design tool 16 have been discussed that restrict access for outside users, access may also be restricted for in-house users. For example, a host organization may desire to make certain proprietary or otherwise confidential information, components, and/or features of system design tool 16 available to only a subset of the total user base within the host organization. Certain in-house users may also be restricted from storing software systems, which they have generated using system design tool 16, in catalog 30.

The present disclosure may be applicable to a wide variety of devices. System design tool 16 may be operable to generate real-time embedded control software systems that may be applicable to any kind of work machine. For example, such work machines may include regular household appliances, such as clothes dryers and microwaves, which can have embedded control systems that operate the equipment based on sensor feedback. Clothes dryers may have sensor dry programs which stop the dryer when a moisture sensor detects that the clothes are dry. Microwaves can have programs that cook food until a moisture sensor detects that the food is finished cooking.

Real-time embedded control software may also be applicable to more industrial types of equipment, such as HVAC systems (e.g., electronic and, in some cases programmable thermostats) or power generation sets (e.g., gas turbine engines that drive electric generators). Further, real-time embedded control software may be applicable to mobile work machines, such as on-road vehicles, as well as off-road vehicles, including both on-road and off-road construction and/or agricultural equipment. Such mobile work machines may include passenger cars, on and off-road hauling vehicles (e.g., dump trucks), earth moving equipment (e.g., track-type tractors (a.k.a. bulldozers), loaders, excavators, etc).

Such real-time embedded control software systems may be operable to control real-time embedded control systems, which may include any electronic system configured to control one or more functions of a work machine with which the embedded control system is associated. For example, an embedded control system of a work machine may be configured to monitor output, directly or indirectly, of components performing functions of the work machine. The embedded control system may be configured to control these functions based on the output monitored by the work machine. An embedded control system may be configured to communicate between electrical components within a local network, wherein the electrical components may be associated with a node of the local network. Embedded control system components may include, for example, one or more processors, such as electronic control units (ECUs) and/or an engine control module (ECM). Embedded control system components, particularly ECUs and/or ECMs, may include memory, such as EPROM or EEPROM, such as flash memory, or any other kind of memory.

An ECM may be configured to control one or more operating parameters of a power source (e.g., an engine). For example, an ECM may be configured to control electronic fuel injectors, electronic throttle controls, etc. An ECM may be configured to control these and/or other parameters based on data collected by the ECM, such as emissions measurements, oxygen content in the exhaust, and closed loop feedback, such as fuel injector operation, air intake, and throttle position.

Embedded control system components may also include one or more output devices controllable by an ECU. The ECU may be configured to control operation of other work machine components, such as work tools. For example, a controllable output device may include an electronic transmission control.

An example of a work machine function controlled by an embedded control system could include a speed limiting feature. When a dump body of a hauling vehicle is in a raised position, an ECU may be configured to control gear selection of the electronic transmission control. Other applications for embedded control systems may include positioning and/or guidance systems. For example, a work machine may be configured to automatically guide itself along a predetermined path based on positioning data gathered by, for example, a global positioning system (GPS). In some cases, work machines may be configured to control positioning of work tools (e.g., dozer blades) based on global or local positioning information, such as GPS data and/or local positioning equipment such as laser-based positioning systems.

It will be apparent to those having ordinary skill in the art that various modifications and variations can be made to the disclosed software development apparatus with regulated user access without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A software system development apparatus hosted by a host organization, comprising:
   a processor;
   a computer-readable medium operatively coupled to the processor;
   a system design tool program stored on the computer-readable medium that, when executed by the processor, is operable to:

grant access to user computers inside and outside the host organization, wherein the user computers are remote from the software system development apparatus;

store, in accordance with the Reusable Asset Specification (RAS), a collection of reusable software components in a catalog in the system design tool program;

generate, in response to commands from one of the user computers, a real-time embedded control software system by selecting one or more software components from the collection of reusable software components stored in the catalog, as well as from one or more collections of reusable software components stored in accordance with RAS outside the host organization, the real-time embedded control software system being generated on the processor of the host organization without any software components being downloaded to the user computers from the host organization; and regulate user access to at least one aspect of the system design tool program according to one or more authorization categories of users of the system design tool program.

2. The apparatus of claim 1, wherein the reusable software components stored in the catalog are available for selection by systems external to the system design tool program.

3. The apparatus of claim 1, wherein the at least one aspect includes at least one of software components stored in the catalog and one or more features of the system design tool program.

4. The apparatus of claim 1, wherein the system design tool program is further operable to store the software system, generated using the system design tool program, in the catalog in such a manner as to be available for future use by users of the system design tool program.

5. The apparatus of claim 4, wherein the system design tool program is operable to store the software system, generated using the system design tool program, in the catalog only if the software system was designed with user access to the system design tool program under a predetermined authorization category.

6. The apparatus of claim 1, wherein the system design tool program is further operable to regulate user access to confidential software of the host organization that is stored in the catalog.

7. The apparatus of claim 1, wherein the system design tool program is further operable to regulate user access to one or more features of the system design tool program that are confidential to the host organization.

8. The apparatus of claim 1, wherein the one or more authorization categories are based, at least in part, on one or more different levels of performance of the system design tool program that are available to users of the system design tool program.

9. A software system development apparatus hosted by a host organization, comprising:
a processor;
a computer-readable medium operatively coupled to the processor;
a system design tool program stored on the computer-readable medium that, when executed by the processor, is operable to:
grant access to user computers inside and outside the host organization, wherein the user computers are remote from the software system development apparatus;

store, in accordance with the Reusable Asset Specification (RAS), a collection of reusable software components in a catalog in the system design tool program;

generate, in response to commands from one of the user computers, a real-time embedded control software system by selecting one or more software components wherein the real-time embedded control software system is generated on the processor of the host organization without any software components being downloaded to the user computers from the host organization;

wherein the system design tool program is configured to be able to select software components from the collection of reusable software components stored in the catalog; and wherein the reusable software components stored in the catalog are available for selection by systems outside the host organization; and regulate user access to at least one aspect of the system design tool program according to one or more authorization categories of users of the system design tool program.

10. The apparatus of claim 9, wherein the at least one aspect includes at least one of software components stored in the catalog and one or more features of the system design tool program.

11. The apparatus of claim 9, wherein the system design tool program is further operable to store the software system, generated using the system design tool program, in the catalog in such a manner as to be available for future use by users of the system design tool program.

12. The apparatus of claim 11, wherein the system design tool program is operable to store the software system, generated using the system design tool program, in the catalog only if the software system was designed with user access to the system design tool program under a predetermined authorization category.

13. The apparatus of claim 9, wherein the system design tool program is further operable to regulate user access to confidential software of the host organization that is stored in the catalog.

14. The apparatus of claim 9, wherein the system design tool program is further operable to regulate user access to one or more features of the system design tool program that are confidential to the host organization.

15. The apparatus of claim 9, wherein the one or more authorization categories are based, at least in part, on one or more different levels of performance of the system design tool program that are available to users of the system design tool program.

16. A method of developing a software system, comprising:
granting access to a system design tool program, stored by a host organization, to user computers inside and outside the host organization, wherein the user computers are remote from a software system development apparatus on which the system design tool program is stored, the system design tool program including a catalog which stores a collection of reusable software components in accordance with Reusable Asset Specification (RAS);
accessing the system design tool program under one of two or more authorization categories of users of the system design tool program, the authorization categories regulating user access to:
a collection of reusable software components, and
one or more features of the system design tool program;

using the system design tool program to access and select one or more reusable software components from a collection of reusable software components stored in accordance with RAS inside the catalog and outside the host organization; and generating, in response to commands from one of the user computers, an embedded control software system utilizing the one or more software components selected from the collection stored inside the catalog and outside the host organization without downloading any software components to the user computers from the host organization.

17. The method of claim 16, wherein the reusable software components stored in the catalog are available for selection by systems external to the system design tool program.

18. The method of claim 16, further including storing the embedded control software system in the catalog in such a manner as to be available for future use by users of the system design tool program.

19. The method of claim 16, wherein the method further includes accessing the system design tool program under an authorization category under which confidential software of the host organization that is stored in the catalog is available to the user of the system design tool program.

20. The method of claim 16, wherein the method further includes accessing the system design tool program under an authorization category under which features of the system design tool program that are confidential to the host organization are available to the user of the system design tool program.

* * * * *